United States Patent [19]

Hirose et al.

[11] Patent Number: 4,823,223

[45] Date of Patent: Apr. 18, 1989

[54] MECHANISM FOR LOCKING TAPE REEL IN MAGNETIC TAPE CASSETTE

[75] Inventors: Kimimoto Hirose; Yasuhiro Hasegawa, both of Tamako, Japan

[73] Assignee: Konica Corporation, Tokyo, Japan

[21] Appl. No.: 183,677

[22] Filed: Apr. 19, 1988

[30] Foreign Application Priority Data

Apr. 21, 1987 [JP] Japan .................. 62-60297[U]

[51] Int. Cl.$^4$ .................. G11B 15/32; G11B 23/02
[52] U.S. Cl. .................. 360/132; 242/198
[58] Field of Search .................. 360/132, 96.1, 96.3; 242/198–199

[56] References Cited

U.S. PATENT DOCUMENTS

| 4,553,717 | 11/1985 | Takagi | 360/132 X |
| 4,604,671 | 8/1986 | Oishi | 360/132 |
| 4,607,307 | 8/1986 | Sieben | 242/199 X |
| 4,623,105 | 11/1986 | Pertzsch et al. | 242/198 |
| 4,631,619 | 12/1986 | Hashizume et al. | 360/132 |
| 4,638,393 | 1/1987 | Oishi et al. | 360/132 |
| 4,679,110 | 7/1987 | Schoettle et al. | 360/132 |
| 4,739,949 | 4/1988 | Lin | 242/198 |

Primary Examiner—John H. Wolff
Attorney, Agent, or Firm—Jordan B. Bierman

[57] ABSTRACT

An object of the invention is to offer an locking mechanism for a tape reel in a magnetic tape cassette so that accidental disengagement and overlocking trouble can be prevented, wherein proper engagement and disengagement between a reel-locking lever and the tape reel is attained by arranging the sliding surface of the reel-locking lever at a predetermined position.

1 Claim, 4 Drawing Sheets 1-a 1-b

MECHANISM FOR LOCKING TAPE REEL IN MAGNETIC TAPE CASSETTE

BACKGROUND OF THE INVENTION

The present invention relates to a magnetic tape cassette used in a video tape recorder (VTR) deck and particularly to a mechanism for locking a tape reel arranged rotatably in a cassette body.

In the conventional magnetic tape cassette used for a household VTR deck, a supply tape reel and a take-up tape reel both of which are wound with a magnetic tape are arranged rotatably in a cassette body, a part of the magnetic tape is extended over the front side of the cassette body, and a reel-locking mechanism is arranged at the rear side between both tape reels.

In aforesaid reel-locking mechanism, when the magnetic tape cassette is inserted into a VTR deck, reel-locking levers disengage from both tape reels to allow the tape reels to rotate and when the cassette is out of the VTR deck, the reel-locking levers engage with both tape reels to prevent them from rotating, thus avoiding the damage of the magnetic tape caused by its slackening. A sample of the art of this kind is shown in FIG. 3.

In Japanese Patent Publication Open to Public Inspection No. 197986/1985 representing aforesaid art, when engagement claw 21 of reel-locking lever 20 engages With serration groove 23 of tape reel 22 and thereby locks the tape reel 22, sliding surface 21a that is a part of the tip of engagement claw 21 positioned in serration groove 23 inner from the engagement point S is located on the curcular arc $\gamma$ whose radius is a segment of a line connecting the engagement point S and a center of supporting shaft 24 that is a center for swiveling of reel-locking lever 20, or the sliding surface 21a is located inside the circular arc $\gamma$ as shown in FIG. 3, thus, it is possible to prevent so-called over-locking state wherein the engagement claw 21 does not disengage from the serration groove 23, and to assure the smooth disengagement.

However, there has been a problem in aforesaid mechanism that the engagement claw of the reel-locking lever easily and accidentally comes off the serration groove when the tape reel is touched and moved through the opening on the bottom of cassette body or the magnetic tape cassette itself is given a shock.

SUMMARY OF THE INVENTION

An object of the invention is to offer the locking mechanism for a tape reel in a magnetic tape cassette that prevents an over-locking and accidental disengagement and assures the proper engagement and disengagement of a reel-locking lever.

The object of the invention is attained by a mechanism for locking a tape reel in a magnetic tape cassette which has therein the tape reels wound with a magnetic tape arranged rotatably in a cassette body, reel-locking levers each of which is supported pivotally around each of supporting shafts provided protrusively inside the cassette body, and engagement claws each located at the tip of each of said reel-locking levers and caused, for locking the tape reel, to engage with one of serrated grooves provided on the external circumferential surface of a guide flange of the tape reel, wherein the engagement claw has a sliding surface being positioned in aforesaid serrated groove when aforesaid tape reel is locked by aforesaid reel-locking lever, the sliding surface is arranged in the manner that the location of the sliding surface is kept within the range of 14 degrees toward the side opposite to the supporting shaft from the line that is perpendicular to the line connecting the axis of aforesaid supporting shaft and the engagement point where the serrated groove and the engagement claw contact each other.

Aforesaid arrangement assures tape reels to be locked and released without causing the reel-locking lever to be over-locked and to come off accidentally being caused by a shock in the engagement of reel-locking levers and tape reels.

BRIEF DESCRIPTION OF THE DRAWINGS

An example of the invention is shown in the drawings and FIGS. 1a & b is an enlarged plan view showing how the reel-locking lever locks a tape reel.

DETAILED DESCRIPTION OF THE INVENTION

Figure 1:
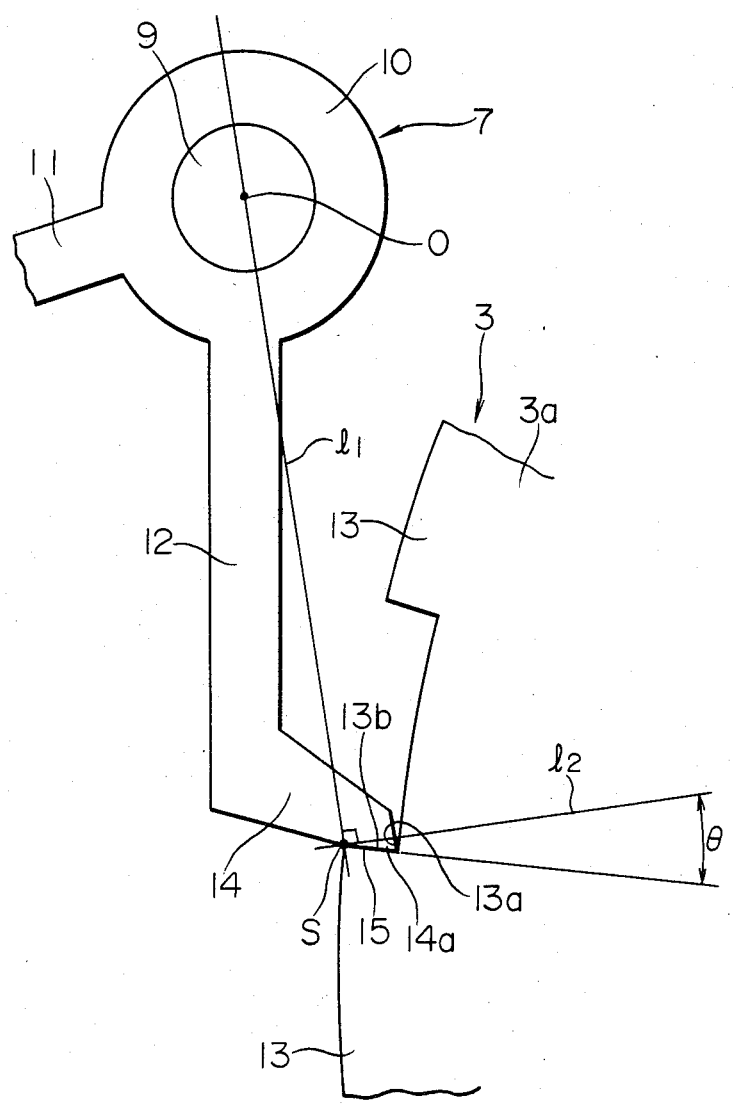
Figure 1:
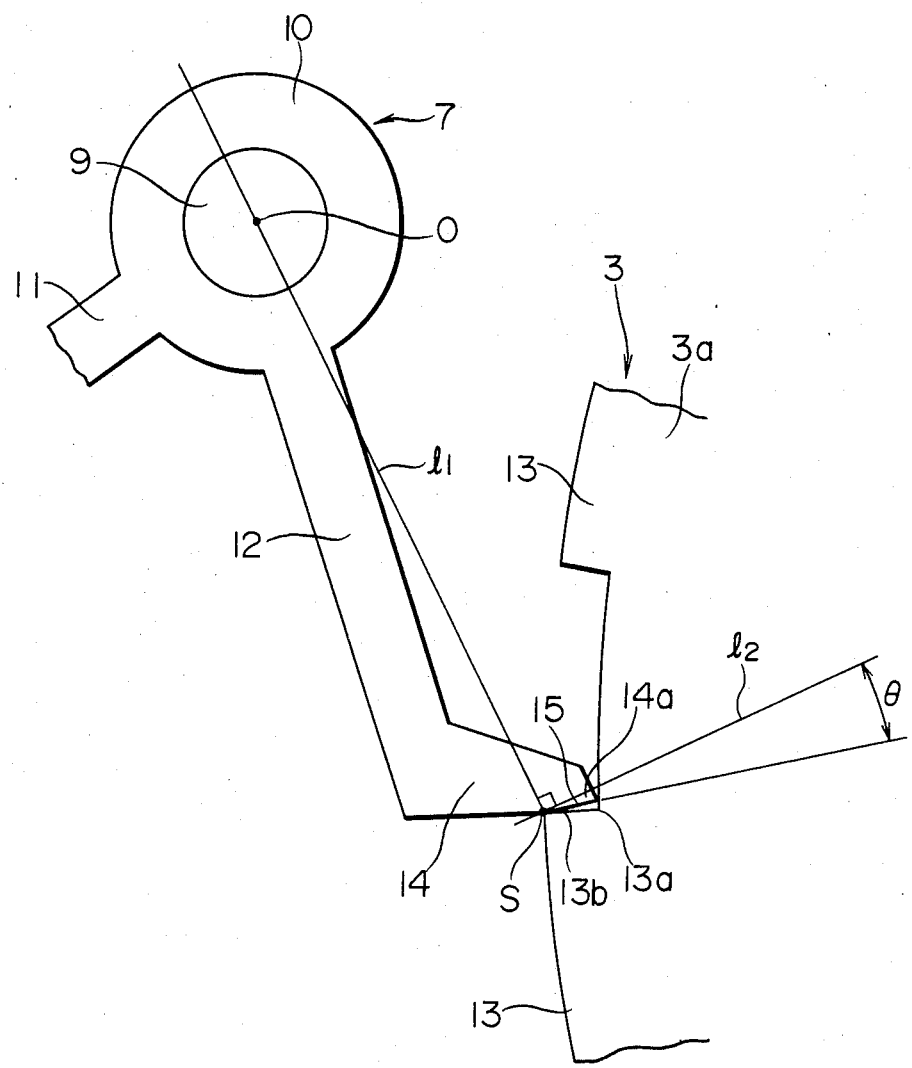

An example of the invention will be explained as follows, referring to the drawings.

Figure 2:
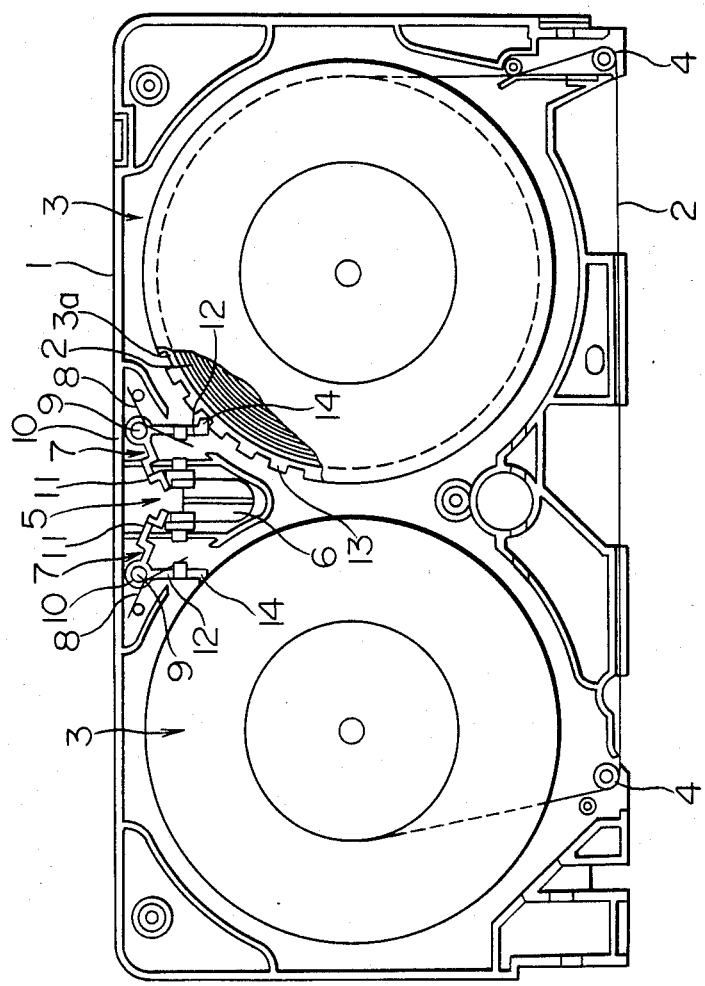
FIG. 2 is a plan view of a magnetic tape cassette whose upper half is not shown and FIG. 3 is an enlarged plan view showing how the conventional reel-locking lever locks the tape reel.
Figure 3:
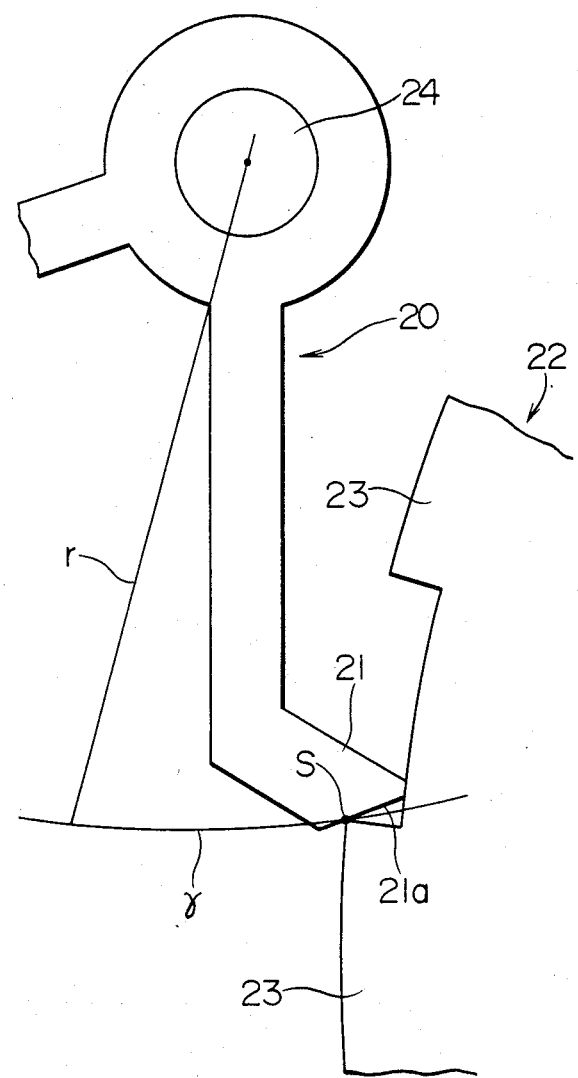

FIG. 2 is a plan view of a magnetic tape cassette excluding its upper half, and in the lower half, supply reel 3 and take-up reel 3 both wound with magnetic tape 2 are arranged rotatably and an in-between part of magnetic tape 2 is expended over tape guides 4 and 4 on the front side of lower half 1.

At the center on the rear side of lower half 1, there is provided reel-locking mechanism 5 that locks both tape reels 3 and 3 when the magnetic tape cassette is not used.

Aforesaid reel-locking mechanism 5 consists of lock-releasing means 6 that is pressed and moved, when a magnetic tape cassette is inserted into a VTR deck, by the lock-releasing pin provided on aforesaid deck, a pair of reel-locking levers 7 and 7 engaging and disengaging with both tape reels 3 and 3 in interlocking action with the movement of aforesaid lock-releasing means 6, and torsion springs 8 and 8 which bias the levers 7 and 7 toward tape reels 3 and 3, wherein both reel-locking levers 7 and 7 are formed symmetrically.

Each reel-locking lever 7 is formed in the manner wherein arm 11 that touches aforesaid lock-releasing means 6 and working arm 12 that locks tape reel 3 are arranged protrusively in a V-shape on sleeve 10 supported around the supporting shaft 9 provided protrusively on the lower half, and at the tip of the working arm 12, there is provided engagement claw 14 that engages with each of groove teeth serrated on the outer circumferential surface of lower guide flange 3a.

FIG. 1 is an enlarged plan view showing the state wherein engagement claw 14 engages with groove tooth 13 and thereby locks supply tape reel 3, and in the locking state as shown in FIG. 1-a wherein the tip 14a of engagement claw 14 touches the bottom corner portion 13a of groove tooth 13, the shoulder portion of groove tooth 13 represents outer engagement point S where engagement claw 14 engages with groove tooth 13, thus, tape reel 3 is prevented from rotating clockwise in FIGS. 1 and 2.

The sliding surface 15 that is a part of an outer face of the engagement claw 14 extending to tip and thereof from the engagement point S and slides on groove tooth 13 is to be provided within the angular range θ of 14°, toward the side opposite to supporting shaft 9, from the line $l_2$ that is perpendicular, at the engagement point S, to the line $l_1$ connecting the engagement point S and the center O of the supporting shaft 9 that is a center of rotation of reel-locking lever 7. In the present example, the sliding surface 15 is arranged to locate along the line of maximum degree of 14° and is arranged to be in the inclination same as that of tooth face 13b of groove tooth 13.

The arrangement of sliding surface 15 is not limitted to the example as shown in FIG. 1-a, it is also possible to arrange sliding surface 15 in the manner as shown in FIG. 1-b wherein sliding surface 15 does not come in contact with tooth face 13b of groove tooth 13.

When the sliding surface 15 is arranged to be positioned beyond the engagement point S toward the direction opposite to the supporting shaft side exceeding 14° from the normal line $l_2$, this causes over-locking and engagement claw 14 does not disengage from groove tooth 13 smoothly, while when the sliding surface 15 is positioned toward the direction same as the supporting shaft side from the normal line $l_2$, this causes the engagement claw 14 to be disengaged, by shock or vibration, easily from the groove tooth 13, resulting the trouble that magnetic tape 2 is slackened. However, when an angle of the sliding surface 15 is set to be in a range of 0°-14° as stated above, this causes no erroneous action and locking and releasing of both tape reels 3 and 3 may be performed smoothly.

Incidentally, for the attainment of an object of the invention, the sliding surface of a reel-locking lever of the invention may be set at any angle within a range of 0°-14° from the normal line in the direction opposite to the supporting shaft, and the outer face that does not touch the groove tooth and does not form the sliding surface may be set at any angle other than the angle of the sliding surface and in any shape because it has no essential function.

According to the above arrangement of the sliding surface of the reel-locking lever in the invention, the above object of the invention can be attained without being limitted to the configuration of groove tooth. However, it may be preferred to form the groove tooth as follows, as a preferable embodiment. Namely, in FIG. 1, it may be preferred that tooth face 13b is slanted against the center line which passes the center of the reel and bottom coner portion 13a of groove tooth 13 so that suitable side relief in the form of opening the upper part of groove tooth can be applied on tooth face 13b. According to this side relief, the engagement and disengagement action between reel-locking lever and groove tooth may be done more smoothly.

In the locking mechanism of the invention, as stated above, the sliding surface on engagement claw of the reel-locking lever that is positioned in the groove tooth on a tape reel when the reel-locking lever locks the tape reel is arranged to be in the range of 0°-14° toward the outside from the line intersecting, at right angles, the line connecting the supporting shaft and the engagement point where groove tooth and engagement claw contact each other thereby, neither over-locking nor trouble that an engagement is easily released by shock or vibration is caused and locking and releasing of tape reel are performed smoothly.

What is claimed is:
1. A device for locking a tape reel in a magnetic tape cassette comprising;
a tape reel having a groove serrated on a circumferential surface thereof,
a reel locking lever being pivotally supported around a shaft fixed in the cassette, thereby said reel locking lever taking at least two positions in which one of the positions is a lock position and the other is a release position,
said reel locking lever having a claw portion capable of coming in engagement with the groove, said claw portion forming an engaging point with an upper part of the groove on the lock position, and
said claw portion having a sliding surface, extending from the engaging point to the bottom part of the groove,
said sliding surface being arranged at angles from 0 to 14 deg to a cross line perpendicular at the engaging point to a line connecting between the engaging point and the center of the shaft, the angles locating at a side of the cross line opposite to the shaft.

* * * * *